United States Patent
Pevny et al.

(10) Patent No.: US 9,992,216 B2
(45) Date of Patent: Jun. 5, 2018

(54) IDENTIFYING MALICIOUS EXECUTABLES BY ANALYZING PROXY LOGS

(71) Applicant: Cisco Technology, Inc., San Jose, CA (US)

(72) Inventors: Tomas Pevny, Praha-Modrany (CZ); Petr Somol, Marianske Lazne (CZ)

(73) Assignee: Cisco Technology, Inc., San Jose, CA (US)

( * ) Notice: Subject to any disclaimer, the term of this patent is extended or adjusted under 35 U.S.C. 154(b) by 179 days.

(21) Appl. No.: 15/040,285

(22) Filed: Feb. 10, 2016

(65) Prior Publication Data

US 2017/0230388 A1   Aug. 10, 2017

(51) Int. Cl.
*H04L 29/06* (2006.01)
*G06F 21/53* (2013.01)
*G06F 21/55* (2013.01)

(52) U.S. Cl.
CPC .......... *H04L 63/1425* (2013.01); *G06F 21/53* (2013.01); *G06F 21/552* (2013.01); *H04L 63/0281* (2013.01); *H04L 63/1433* (2013.01); *H04L 63/1416* (2013.01)

(58) Field of Classification Search
CPC ............. H04L 63/1425; H04L 63/1416; H04L 63/1433; H04L 63/0281; G06F 21/53; G06F 21/552
See application file for complete search history.

(56) References Cited

U.S. PATENT DOCUMENTS

| | | | |
|---|---|---|---|
| 7,661,136 B1 | 5/2010 | Spielman | |
| 7,882,542 B2 | 2/2011 | Neystadt et al. | |
| 8,117,655 B2 | 2/2012 | Spielman | |
| 8,555,385 B1 | 10/2013 | Bhatkar et al. | |
| 8,713,674 B1 | 4/2014 | Geide | |
| 2004/0117658 A1 | 6/2004 | Klaes | |

(Continued)

FOREIGN PATENT DOCUMENTS

EP   2610776 A2   7/2013

(Continued)

OTHER PUBLICATIONS

Konstantinos Sechidis et al., "Statistical Hypothesis Testing in Positive Unlabelled Data," ECMLPKDD 2014, Part III, LNCS 8726, pp. 66-81, 2014.

(Continued)

*Primary Examiner* — Hadi S Armouche
*Assistant Examiner* — Cheng-Feng Huang
(74) *Attorney, Agent, or Firm* — Edell, Shapiro & Finnan, LLC

(57) ABSTRACT

Identifying malicious executables by analyzing proxy logs includes, at a server having connectivity to the Internet, retrieving sets of proxy logs from a plurality of proxy servers. Each proxy server of the plurality of proxy servers is associated with a network and generates network traffic logs for one or more nodes included in the network. Then, a set of executables hosted by each of the one or more nodes associated with each of the plurality of proxy servers is determined. Each set of executables is analyzed to detect a specific executable and portions of each of the network traffic logs that are associated with the specific executable are identified. An alert is generated indicating the portions of each of the network traffic logs as likely to be associated with the specific executable.

15 Claims, 8 Drawing Sheets

(56) References Cited

U.S. PATENT DOCUMENTS

2008/0313734 A1* 12/2008 Rozenberg .......... H04L 63/1425
                                                    726/22
2013/0097706 A1   4/2013 Titonis et al.
2015/0172311 A1*  6/2015 Freedman ........... H04L 63/1433
                                                    726/1

OTHER PUBLICATIONS

"Cisco AMP Threat Grid: Get Proactive with Advanced Malware Security," http://www.cisco.com/go/amptg, 2015.

* cited by examiner

IDENTIFYING MALICIOUS EXECUTABLES BY ANALYZING PROXY LOGS

TECHNICAL FIELD

The present disclosure relates to network security.

BACKGROUND

Cybersecurity and, in particular, network security is a rapidly developing field. Generally, cybersecurity techniques attempt to identify malicious activity by analyzing as much information as possible in order to identify patterns, signatures, and other such identifiers. Sandboxing is currently one tool used in network security to obtain information regarding network threats, such as malicious executable files and programs (collectively referred to herein as executables). Sandboxes run suspicious (e.g., potentially dangerous) executables in a controlled software and hardware environment and observe and/or record various effects caused by the executables, such as generated network traffic, system calls, and/or created artifacts. Based on these observations, executables can often be reliably classified as malicious or benign.

Sandboxing is, however, costly. To be effective against a quickly evolving threat landscape, a sandbox must manage to evaluate tens or hundreds of thousands of executables per day. Evaluations need to be limited in time and, as such, the typical length of a network traffic capture is about 5 minutes during sandboxing. Sandboxes also require extensive maintenance in order to remain up to date with the evolving threat landscape and to combat malware with new sandbox detection techniques.

DESCRIPTION OF EXAMPLE EMBODIMENTS

Overview

Figure 1:
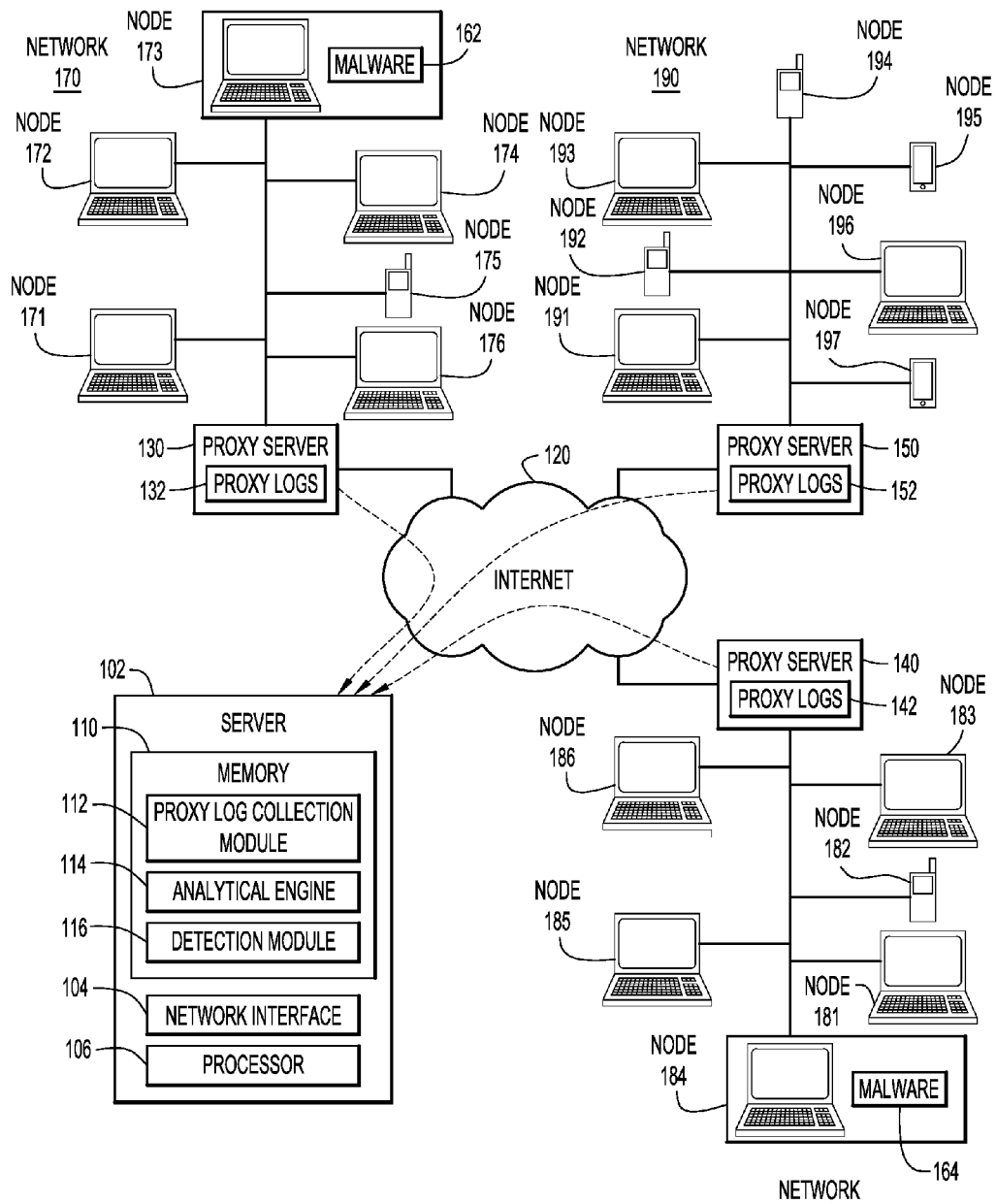
FIG. 1 is a block diagram illustrating a networking environment in which malicious executables may be identified, according to an example embodiment.

Techniques are provided herein for identifying malicious executables by analyzing proxy logs. These techniques may be embodied as a method, a system, and instructions in a computer-readable storage media to perform the method. According to at least one example embodiment, malicious executables are identified by analyzing proxy logs. A server having connectivity to the Internet retrieves sets of proxy logs from a plurality of proxy servers. Each proxy server of the plurality of proxy servers is associated with a network and generates network traffic logs for one or more nodes included in the network. A set of executables hosted by each of the one or more nodes associated with each of the plurality of proxy servers is determined. Each set of executables is analyzed to detect a specific executable and portions of each of the network traffic logs that are associated with the specific executable are identified. An alert is generated indicating the portions of each of the network traffic logs as likely to be associated with the specific executable.

Example Embodiments

Presented herein are techniques for identifying malicious executables (e.g., executable files and/or executable programs) hosted by a node in a network by analyzing proxy logs. Generally, the techniques presented herein allow on-demand analysis targeted at a specific executable and/or creation of a complete database of results for all possible executables as result of analysis targeting all available proxy-logs. The techniques presented herein utilize large-scale network proxy logs to obtain information that is analogous and/or complementary to information conventionally captured by sandboxing techniques and, thus, the information gathered with techniques presented herein may be used in lieu of or together with information conventionally captured by sandboxing techniques. For example, the information obtained with techniques presented herein may be used in a stand-alone fashion to identify network traffic associated with malicious executables and/or may be used to further investigate executables that sandboxing techniques identify as likely to be malicious. As a more specific example, if conventional sandboxing techniques are utilized to determine that an executable is likely to be malicious but time constraints do not allow for a further, deeper investigation, techniques presented herein may be used to gather additional information by analyzing network traffic from additional nodes and/or network traffic from longer time periods. These techniques can significantly increase sandboxing throughput, reduce or remove executable run time limits, prevent malware from hiding its activity, and/or reduce the cost of sandboxing.

Moreover, when used in lieu of sandboxing techniques, the techniques presented herein provide information pertaining to malicious or potentially malicious executables without a dedicated controlled environment. Consequently, a majority of the benefits of conventional sandboxing techniques can be realized without a dependence on high cost, high-maintenance sandboxes. For example, techniques presented herein can identify malicious executables without developing and updating anti-evasion techniques that are frequently used in sandboxes to combat malware techniques that prevent malware from being discovered while running in a sandbox (as opposed to running on a real computer), such as techniques that delay malware deployment until a certain time interval (e.g., five minutes) after initiation. Moreover, techniques presented herein can capture network traffic over any time period for any number of nodes since the techniques are not restricted by the time and cost restrictions typically associated with sandboxes.

Reference is now made to FIG. 1, which illustrates a network environment 100 in which identification, analysis, and other such methods presented herein may be employed, according to an example embodiment. Networking environment 100 includes a virtual or physical server 102, which includes a network interface (e.g., one or more network interface cards) 104, a processor 106, and a memory 110. The network interface 104 provides connectivity to the Internet 120 and the processor 104 is configured to execute instructions stored on memory 110. For example, the memory 110 includes a number of software modules and/or engines, including a proxy log collection module 112, analytical engine 114, and detection module 116, and the processor 104 is configured to execute instructions stored on each of these modules or engines. More specifically, proxy log collection module 112 is configured to cause the processor 106 to retrieve (e.g., collect) proxy logs from proxy servers (e.g., proxy server 130, proxy server 140, and proxy server 150), the analytical engine 114 is configured to cause the processor 106 to analyze retrieved proxy logs, and the detection module 116 is configured to cause the processor 106 to detect specific executables, such as malicious executables, and determine specific network traffic associated with the specific executables.

The memory 110 may also be configured to store any network traffic included in retrieved proxy logs, information relating to identifying malicious executables, instructions for identifying malicious executables, instructions for identifying portions of network traffic associated with a specific executable and/or any other data. Generally, memory 110 may include read only memory (ROM), random access memory (RAM), magnetic disk storage media devices, optical storage media devices, flash memory devices, electrical, optical or other physical/tangible (e.g., non-transitory) memory storage devices. Thus, in general, the memory 110 may be or include one or more tangible (non-transitory) computer readable storage media (e.g., a memory device) encoded with software comprising computer executable instructions. For example, memory 110 may store instructions that may be executed by processor 106 for performing the malicious executable identification, as described below with reference to the Figures. In other words, memory 110 may include instructions, that when executed by one or more processors, cause the one or more processors to carry out the operations described below in connection with the Figures.

Moreover, although each module and engine described herein, such as the proxy log collection module 112, the analytical engine 114, and the detection module 116 is shown stored in memory 110, each module and engine described herein, may be embodied by hardware, or a combination of hardware and software. For example, each module and engine may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of a module or engine by processor 106 can also refer to logic based processing by the module or engine that is initiated directly or indirectly by the processor 106 to complete a process or obtain a result. Alternatively or additionally, each module and engine can include memory hardware, such as at least a portion of memory 110, for example, that includes instructions executable by processor 106 to implement one or more of the features of the module or engine. When any one of the modules or engines includes instructions stored in memory and executable by the processor 106, the module or engine may or may not include a processor. In some examples, each module or engine may include only memory storing instructions executable with the processor 106 to implement the features of the corresponding module or engine without the module or engine including any other hardware.

Still referring to FIG. 1, the server 102 is connected, via network interface 104, to a number of proxy servers (e.g., proxy server 130, proxy server 140, and proxy server 150) via the Internet 120. In the depicted embodiment, proxy server 130, proxy server 140, and proxy server 150 each acts as an intermediary for requests coming from a network with which the proxy server is associated. Moreover, proxy server 130, proxy server 140, and proxy server 150 each stores proxy logs of network communications to Internet 120 established via that proxy server. In the depicted embodiment, proxy server 130 stores proxy logs 132, proxy server 140 stores proxy logs 142, and proxy server 150 stores proxy logs 152. In some embodiments, proxy logs 132, proxy logs 142, and proxy logs 152 may each include a specific proxy log for each node in the network with which its respective proxy server is associated. Accordingly, proxy logs 132, proxy logs 142, and proxy logs 152 may each be referred to herein as a set of proxy logs.

In the embodiment depicted in FIG. 1, proxy server 130 acts as an intermediary for network 170, proxy server 140 acts as an intermediary for network 180, and proxy server 150 acts as an intermediary for network 190. Each network includes one or more nodes (virtual or physical nodes) that may each be associated with a user. More specifically, network 170 includes nodes 171-176, network 180 includes nodes 181-186, and network 190 includes nodes 191-197. However, this arrangement (e.g., three proxy servers acting as intermediaries for three networks that each include six or seven nodes) is only shown for simplicity. In other embodiments, the server 102 may be connected to any number of proxy servers and each of the proxy servers may act as an intermediary for any number of networks or nodes. In other words, in other embodiments the network environment 100 may be any desirable size. In fact, in some embodiments, the techniques presented herein may provide improved results as the number of proxy servers (or more specifically, the number of nodes) increases.

Moreover, in FIG. 1, various nodes are represented with various computing devices. For example, node 173 is represented as a laptop computer, node 197 is represented as a tablet, and node 192 is represented as a smartphone. These representations are not intended to be limiting and, in other embodiments, the nodes may support any type of computing device for any user. Each of the computing devices may include any desirable network interface or network equipment to enable the computing devices to connect to the Internet 120 from a node of a network (e.g., network 170, 180 or 190) via a proxy server. Additionally, in FIG. 1, malware 162 resides and is executed on node 173 while malware 164 resides and is executed on node 184. As used herein, malware 162 and malware 164 refer to executable files and/or programs (e.g., executables) that each causes a computer/processor to execute instructions. The malware may be in a machine language, interpreted language, intermediate language, script language or any other language now known or hereinafter developed that causes a computer/ processor to execute instructions. For simplicity, only nodes 173 and 184 are shown as hosting malware. However, in other embodiments, a plurality of computing devices, servers and other network devices that may also be infected by malware.

Figure 2:
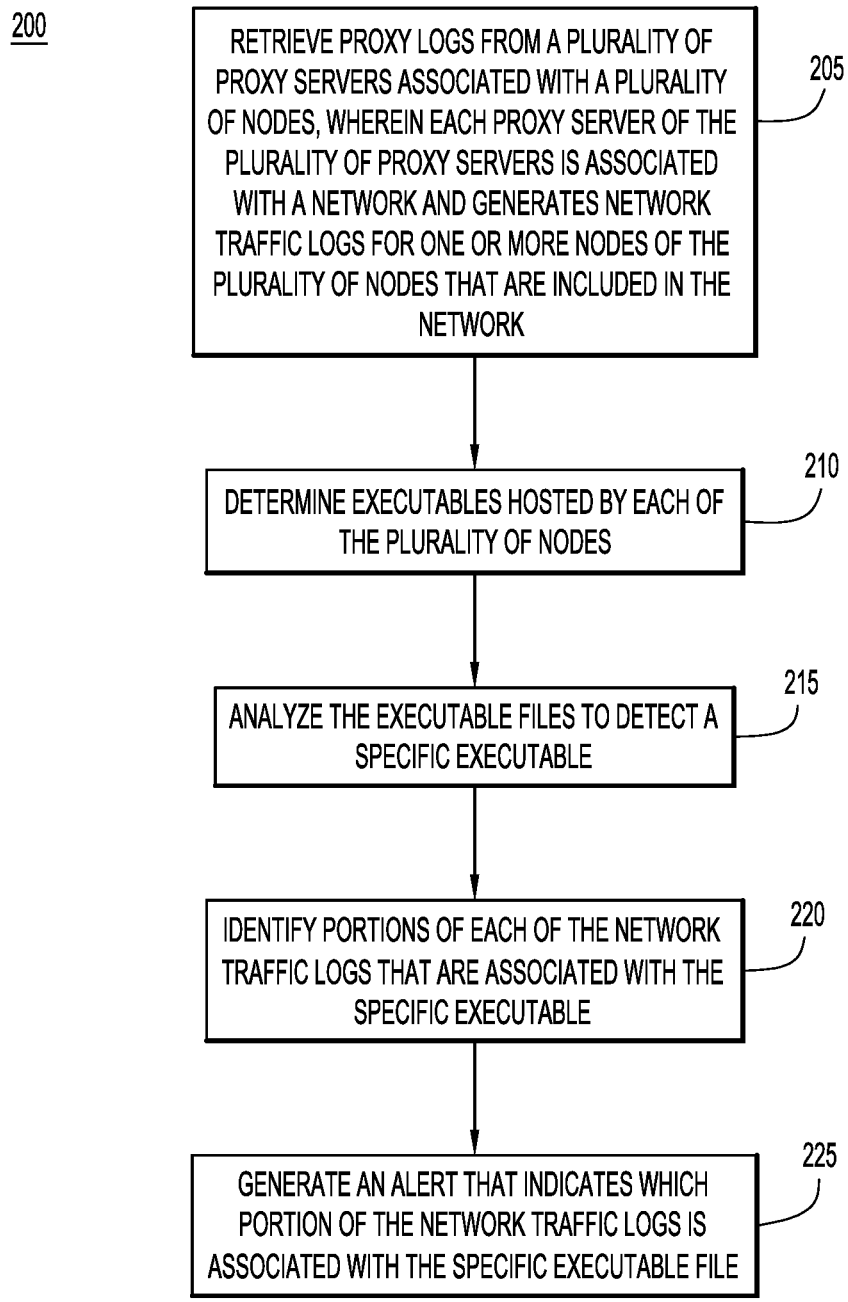
FIG. 2 is a high-level flowchart illustrating a process for identifying executables by analyzing proxy logs, according to an example embodiment.

Now referring to FIG. 2, a flowchart is now described of a method 200 performed by server 102, for example, for identifying malicious executables by analyzing proxy logs, according to an example embodiment. Reference is also made to FIG. 1 for purposes of the description of FIG. 2. Initially, proxy logs are retrieved for a group of nodes (e.g., observed nodes), such as by executing software instructions included in the proxy log collection module 112. The proxy logs are retrieved from one or more proxy servers acting as intermediaries for one or more networks that include the observed nodes. In some embodiments, a set of proxy logs is retrieved from a plurality of proxy servers that are each associated with a specific network and each proxy log in a set of proxy log documents or logs network traffic for a specific node in that network. Accordingly, in some embodiments, proxy logs may be retrieved in sets that are sorted by node. However, in other embodiments, proxy logs of any organizational structure (or lack thereof) may be retrieved.

In some embodiments, in may be sufficient to retrieve proxy logs covering five or more minutes of network traffic; however, the techniques described herein only improve as the length of coverage increases to cover hours or days of network traffic. More specifically, as the number of observed nodes increases, the statistical validity of findings provided by the techniques presented herein may increase. In some embodiments, statistical validity may be ensured when a few hundred nodes are observed; however, in other embodiments, statistical validity may only be ensured by observing tens of thousands of nodes over a variety of networks. In order to collect this amount and variety of proxy logs, cloud based security devices or services may be utilized.

At step 210, the proxy logs are analyzed, such as by executing software instructions included in the analytical engine 114, to determine which executables are being hosted by each of the observed nodes. In other words, the presence of an executable file on a network node is identified. In some embodiments, this information is extracted from retrieved proxy logs. For example, the network traffic in retrieved proxy logs can be analyzed in order to identify references to executables or executable names. Additionally or alternatively, network traffic included in retrieved proxy logs can be analyzed to identify traffic (e.g., Hypertext Transfer Protocol (HTTP) traffic) known to originate from an executable (e.g., as determined by other information sources, such as a previous sandbox run). However, in some embodiments, the information extracted from the network traffic included in the proxy logs may be supplemented with information retrieved from other techniques. For example, executables hosted by a particular node may be identified by monitoring executable file launches directly in the operating system of a node or by analyzing other information that may be available (e.g., a hash of a process reported by a secure mobility client, such as a Virtual Private Network (VPN) client may identify the specific executable file and, thus, HTTP(S) requests logged by the VPN client may be analyzed in order to extract a set of observed hashes and a set of network traffic attributable to each hash that is generated by the executable).

At step 215, the executable files associated with each of the nodes are analyzed, such as by executing software instructions included in the analytical engine 114, to detect the presence of at least one specific executable file, such as a known malicious executable or a suspicious executable that may be malicious. As an example, in some embodiments, a list of executables is generated for each node at step 210 and, then, each of the generated lists is searched for a specific executable, such as a malicious executable, at step 215. In some embodiments, a search is conducted for a specific executable that is known to be malicious in order to generate more information about the executable, such as the type of network traffic associated with the malicious executable. However, in other embodiments, a search may be conducted for a specific executable in order to gather more information and determine if that specific executable is malicious. In some embodiments, any observed nodes containing the specific executable are grouped into a first group of nodes while the observed nodes that do not contain the specific executable are grouped into a second group. This process is described in more detail below with respect to FIG. 4.

Moreover, although step 215 provides that the executable files associated with each of the nodes are analyzed to detect a specific executable, this is not intended to limit the analysis to a single executable. In fact, to the contrary, in some embodiments, the executable files associated with each of the nodes may be analyzed to detect the presence of multiple executables. In some embodiments, multiple executables may be detected in one run, perhaps by using different indicators for each of the different specific executables. Alternatively, the lists of executables associated with each node may be analyzed iteratively in order to detect a number of different specific executables in sequential runs. Consequently, when the term specific executable is used herein, it is not intended to be limiting and may in fact refer to multiple executables. However, that being said, in some embodiments, the analysis performed at step 215 may only be applicable to executables that have appeared in a network monitored by the server. In these embodiments, even the availability of the respective binary code may not allow analysis to be performed for that particular executable.

At step 220, portions of each of the network traffic logs that are associated with (or likely to be associated with) the specified executable are identified, such as by executing software instructions included in the detection module 116. In some embodiments, the identifying is performed by comparing the nodes that have been grouped into the first and second groups (a group of nodes associated with a specific executable and a group of nodes not associated with a specific executable) with other nodes in their group as well as nodes in the other group. This specific embodiment is discussed in further detail below with respect to FIGS. 3 and 5. However, in other embodiments, portions of network traffic that are associated with or can be attributed to the specific executable can be determined in any other manner.

Once portions of the network traffic associated with the specified executable are identified, an alert can be generated, at step 225, to indicate the identified portion of the traffic as being malicious, possibly malicious, and/or simply associated with the specific executable. These portions of the network traffic can then be evaluated with various techniques to determine if the specific executable is malicious. For example, if the executable causes the node to visit malicious domains or a large number of advertisement-related domains, the executable may be determined to be malicious. More specifically, the network traffic associated with a particular executable may be evaluated for indicators of compromise (IOC's), such as a proportion of low-reputation destination domains, a high volume of outgoing requests, outgoing traffic for an executable masked as document, and/or any IOC's that may be used with conventional sandboxing techniques. Then, each of the IOC's may be evaluated for maliciousness through a variety of computer learning and malware detection techniques. If a specific executable is known or determined to be malicious, remedial actions may be taken. For example, inbound and outbound traffic related to the domains included in the identified portion of network traffic could be denied.

Additionally or alternatively, once an alert is generated at step 225, machine learning algorithms can be run against the portion of the traffic identified as being associated with the specific executable. The machine learning algorithms may learn human-invisible patterns from the sequences of requests included in the network traffic, such as various frequency based histograms, repetition patterns, entropy based indicators, and other such patterns. This learning can be performed with a focus on patterns that efficiently distinguish known malicious executables from a large body of benign traffic. Once identified, the patterns enable determinations of maliciousness to be made with respect to the evaluated executables. These patterns may, in some embodiments, recognize maliciousness where manually-defined IOCs do not. Moreover, in some embodiments, once identified, the traffic patterns known to be associated with a malicious executable (or even the traffic patterns known to be associated with a non-malicious executable of interest) could be used by cloud and network administrators to enforce service usage rules by blocking traffic when a known pattern is identified. Since the patterns could be identified while the traffic is in transit, the traffic could be blocked without access to an endpoint and without explicit knowledge of protocol details or other specifications of the service.

Still further, knowledge of traffic related to a given executable can help to detect data exfiltration or an unwanted transfer of personal identifiable information (PII) outside an endpoint. For example, if an administrator is evaluating third-party software updates before applying the application to network nodes, the administrator may decide to block the update and investigate further if the traffic generated by the updated executables is heavier or contains different or additional patterns, as compared to traffic patterns expected from these executables based on data produced by the techniques provided herein. This may prevent an update from unwantedly extracting PII upon installation.

Figure 3:
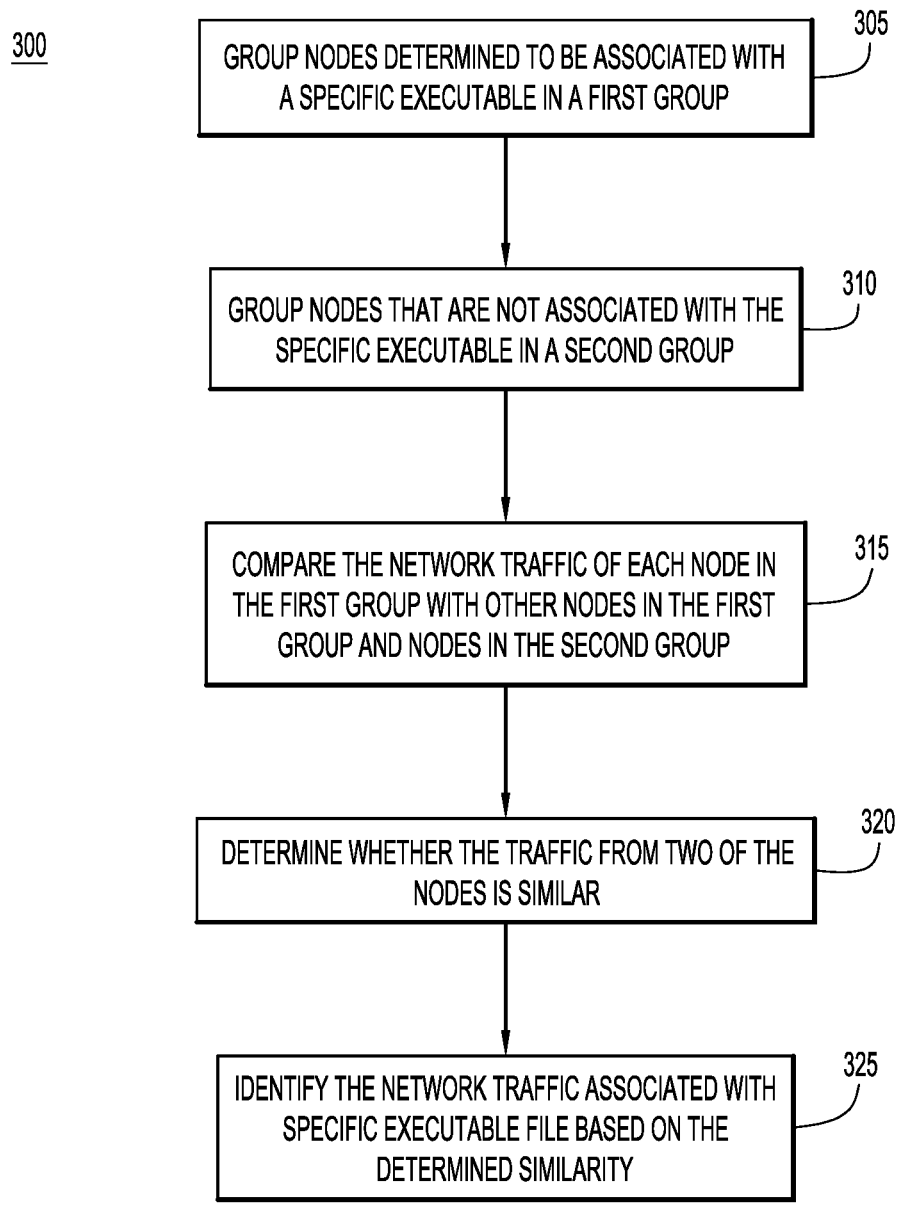
FIG. 3 is a flowchart illustrating a process for identifying portions of a network traffic log that are associated with a specific executable, according to an example embodiment.

Referring to FIG. 3, a flowchart is now described of a method 300 for identifying portions of network traffic associated with a specific executable (e.g., as performed at step 220 from method 200), such as by executing software instructions included in the detection module 116, according to an example embodiment. Initially, at steps 305 and 310, the observed nodes are grouped into a first group and a second group. The first group includes any nodes (as well as the network traffic for these nodes) that were determined to be hosting a specific executable (e.g., at step 215 of method 200) while the second group includes any nodes that were not determined to be hosting the specific executable. Consequently, after steps 305 and 310, any network traffic that can be attributed to the specific executable at issue will be included in the first group. The remaining steps of method 300 determine the precise portions of the network traffic of the nodes in group 1 that can be attributed to the specific executable being investigated or evaluated at the moment.

At step 315, the network traffic of each node in the first group is compared to: (1) the network traffic of other nodes in the first group; and/or (2) the network traffic of nodes included in the second group. The former comparison (e.g., intra-group comparisons across the first group) may identify candidate similarities across the nodes that are associated with the specific executable. Meanwhile, the latter comparisons (e.g., inter- or cross-group comparisons between the first group and second group) may identify candidate similarities across nodes in the first and second groups. In some embodiments, the comparisons performed at step 315 may also identify network traffic that is unique to a single or small number of nodes. In some embodiments, unique traffic may be designated as possibly malicious and/or selected for further investigation. However, in other embodiments, network traffic that is exclusive to a single or small group of nodes may be designated as an outlier since it may be unlikely that network traffic attributable to a malicious executable is only present on a single or small group of nodes (perhaps out of tens of thousands of nodes).

At step 320, the comparison results from step 315 are evaluated to determine whether network traffic from two of the compared nodes is similar (e.g., are the candidate similarities truly similar). If portions of the network traffic from nodes in the first group is determined to be similar, this may indicate that the portions of the network traffic are likely to be associated with or attributable to the specific executable being investigated or evaluated. By comparison, if a portion of network traffic from nodes in the first group is determined to be similar to network traffic from nodes in the second group, this may indicate that the portion of network traffic is unlikely to be associated with or attributable to the specific executable. More specifically, in at least some embodiments, intra-group similarities may reveal a list of network traffic that is likely to be associated with or attributable to a specific executable and the cross-group similarities may trim or pare this list. Consequently, in some embodiments, traffic that is similar across the nodes in the first group and also different from nodes in the second group is attributed to the specific executable being evaluated and may be identified as such 325.

Still referring to step 320, in order to make a determination of similarity any measure of similarity be used. For example, in some embodiments, a similarity determination may be made by comparing network traffic, or portions thereof, based on whether the traffic targets the same domains or sets of domains, whether the traffic has equal or near-equal timing and transfer size fingerprints (e.g., persistence fingerprints), and/or whether the traffic has equal or near-equal query structure or domain path structure. Moreover, in some embodiments, similarity candidates may be compared to a similarity threshold based on at least the aforementioned similarity measures. Regardless of the similarity measure utilized to determine similarity, once this similarity measure is defined, it can be directly applied to determine the portions of network traffic that are similar across the first group (e.g., portions that satisfy the similarity threshold) and the portions of the network traffic that are dissimilar from the second group (e.g., portions that fail to satisfy the similarity threshold).

As mentioned, the similarity determinations made at step 320 allow the portions of the network traffic associated with the specific executable files to be identified at step 325. More specifically, the similarity determinations will filter out (e.g., denote as not attributable to the executable) portions of the network traffic that are common to the first group and second group because these portions will be found to be similar across the two groups. Similarly, portions of the network traffic that are unique to a specific node will be filtered out (e.g., denoted as not attributable to the executable) because the portions will not be determined to be similar to any other nodes in the first group. Meanwhile, portions of the network traffic associated with the specific executable being evaluated will be identified because these portions will be determined to be similar to other portions of network traffic for nodes in the first group and dissimilar (or at least not similar enough to satisfy the selected similarity measure or threshold) from network traffic in the second group.

Figure 4:
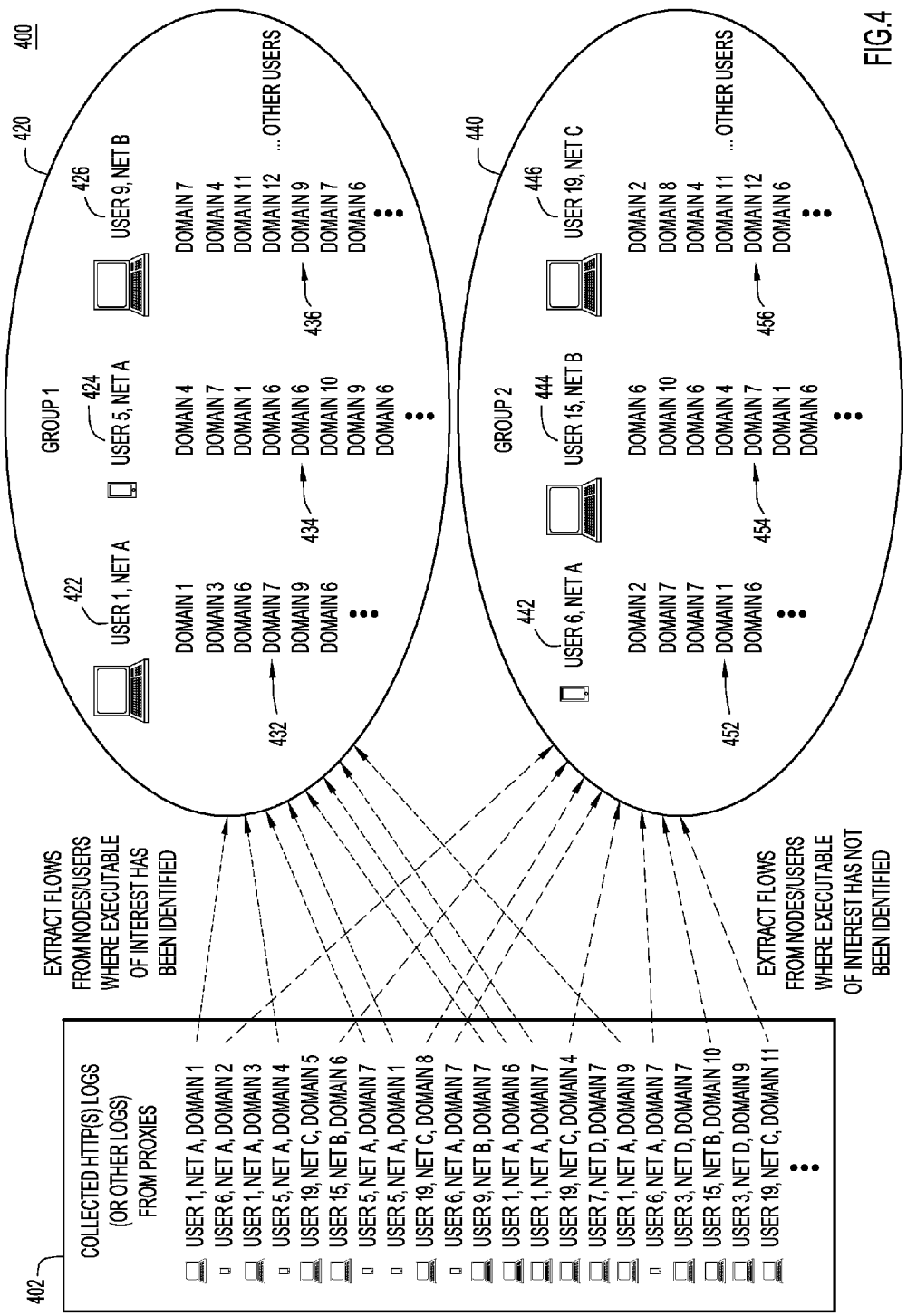
FIG. 4 is a diagram depicting the determination of node groups based on the presence of an executable in order to identify portions of a network traffic log that are associated with a specific executable, according to an example embodiment.
Figure 5:
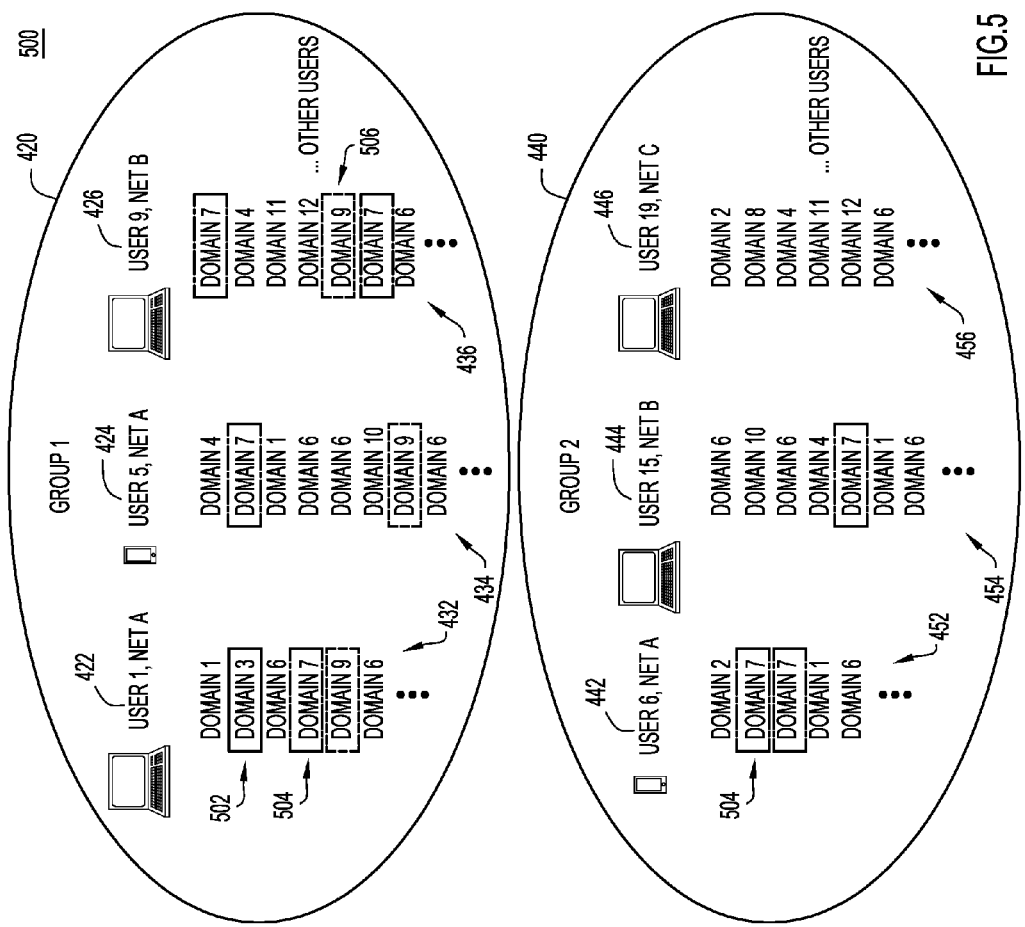
FIG. 5 is a diagram depicting comparisons performed between and within node groups to determine the portions of network traffic that are associated with a specific executable, according to an example embodiment.

Reference is now made to FIGS. 4 and 5, for a description of diagrams 400 and 500, respectively, which depict the method 300 of identifying portions of network traffic associated with a specific executable. In diagram 400, network traffic 402 is initially gathered from proxy servers for any observed nodes. Based on the information included in the proxy logs, network traffic may be tagged or otherwise associated with a node or user and a network that it is was retrieved from. For example, in diagram 400, network traffic 402 is associated with a user, such as user 1 or user 19, and a network, such as network A (Net A) or network C (Net C).

Once a determination is made as to which users (e.g., nodes) are associated with a specific executable being evaluated, the network traffic 402 is sorted, by user (e.g., node) into two groups: Group 1 shown at reference numeral 420 and Group 2 shown at reference numeral 440. Group 1 includes users that have been determined to be associated with the specific executable of interest and group 2 includes users that have not been determined to be associated with the specific executable of interest. Thus, as an example, group 1 includes at least user 422 (user 1 from network A), user 424 (user 5 from network A) and user 426 (user 9 from network B), as well as the network traffic associated with each of these users (network traffic 432, network traffic 434, and network traffic 436, respectively) because each of these users was determined to be associated with the executable of interest. Meanwhile, in the depicted example, group 2 includes at least user 442 (user 6 from network A), user 444 (user 15 from network B) and user 446 (user 19 from network C), as well as the network traffic associated with each of these users (network traffic 452, network traffic 454, and network traffic 456, respectively) because each of these users was not determined to be associated with the executable of interest.

In diagram 500, the network traffic for the users in group 1 420 is compared to the network traffic of other users in group 1 and to the network traffic of users in group 2. These comparisons reveal a piece of network traffic 502 that is unique to user 422 (boxed with a solid line), a portion of network traffic 504 that is similar to portions of network traffic included in both group 1 and group 2 (boxed in dashed and dotted lines (-.-.), and a portion of network traffic 506 that is similar to portions of network traffic included in only network traffic 432 and 434 (and, thus, dissimilar from any network traffic included in group 2) (boxed in dashed lines). Based on these similarity determinations, the network traffic 506 is determined to be the portion of network traffic associated with or attributable to the executable currently being evaluated.

Figure 6A:
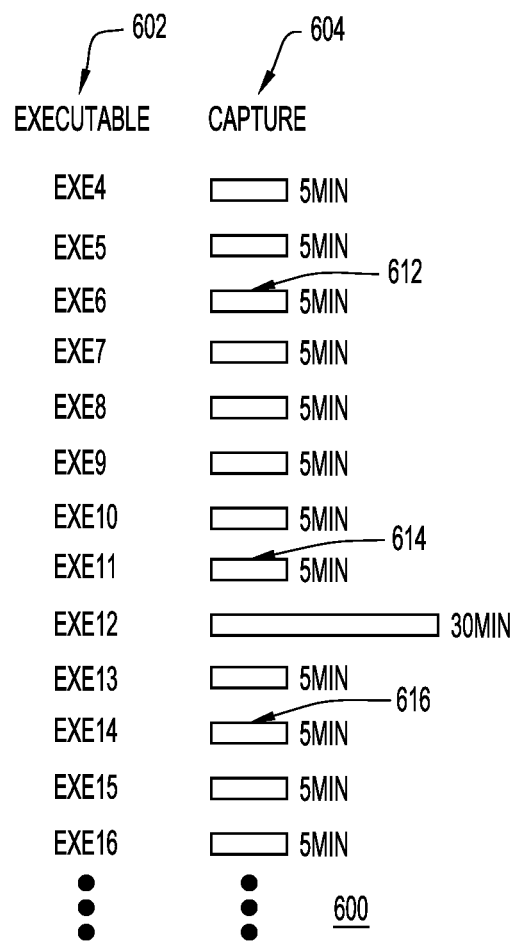
FIG. 6A is a diagram depicting network traffic captured by conventional sandboxing methods.
Figure 6B:
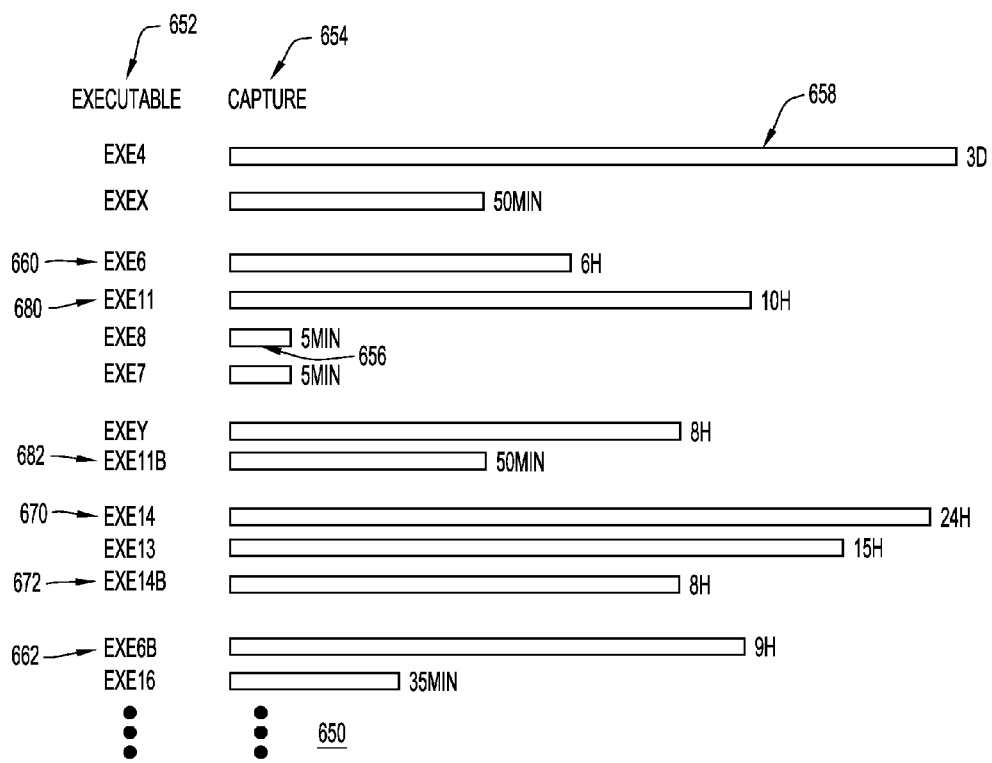
FIG. 6B is a diagram depicting network traffic captured based on techniques presented herein, according to an example embodiment.
Figure 6C:
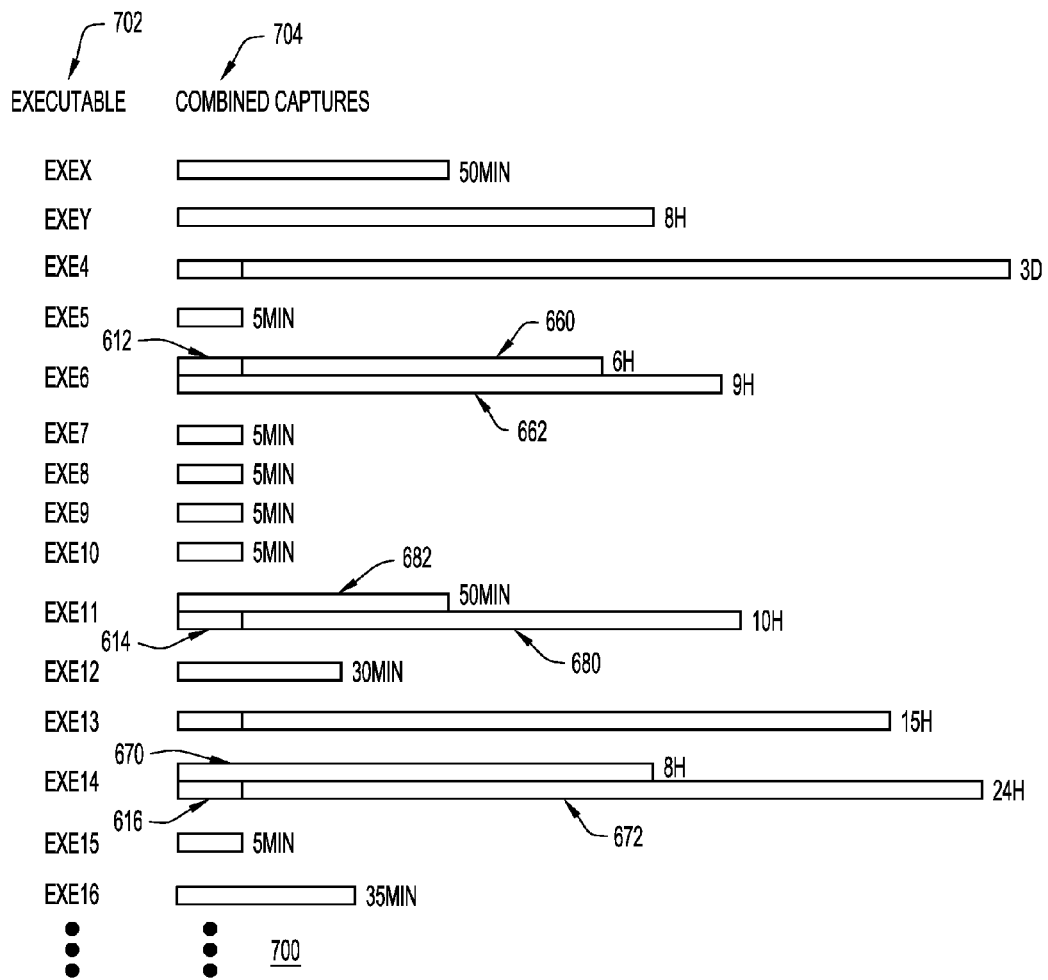
FIG. 6C is a diagram depicting network traffic captured when the network traffic captured based on techniques presented herein, as shown in FIG. 6B, is combined with the network traffic captured based on conventional sandboxing techniques, as shown in FIG. 6A, according to an example embodiment.

Now referring to FIGS. 6A, 6B, and 6C, diagrams 600, 650, and 700 are described to explain applications of the techniques described herein. FIG. 6A depicts conventional sandboxing techniques and is shown to enable a comparison of the techniques described herein with conventional sandboxing techniques when the techniques described herein are used in a stand-alone manner (e.g., independently of sandboxing techniques). By comparison, FIG. 6B illustrates data that is retrieved and utilized by the techniques described herein when these techniques are used in a stand-alone manner (e.g., independently of sandboxing techniques). FIG. 6C illustrates a combination of the data captured in FIGS. 6A and 6B to illustrate how the techniques described herein may be utilized together with conventional sandboxing techniques to retrieve and utilize more detailed data that may allow for more a more detailed of analysis of suspicious executables.

In FIG. 6A, diagram 600 depicts an example of the amount of network traffic that is captured via conventional sandboxing. The network traffic captured is sorted by executables at column 602 and the length of a network traffic capture is illustrated in column 604. Notably, when conventional sandboxing techniques are utilized, a high number of tests may be run; however, the length of a capture is typically limited due to the high costs associated with sandboxing techniques. Accordingly, in diagram 600, five minutes of network traffic is captured for nearly every executable, examples of which are highlighted at 612, 614, and 616 for executables 6, 11, and 14, respectively. The one exception is executable 12 (exe12), for which thirty minutes of network traffic is captured in order to illustrate the capacity of sandboxing techniques to occasionally accommodate longer captures of network traffic. Moreover, when conventional sandboxing techniques are utilized, only a limited number of cases can be tested for each executable, due to time and costs restrictions. In the depicted example, a single case is run for each of the examined executables (e.g., exe4-16 each appear once in the diagram 600).

By comparison, in FIG. 6B, diagram 650 depicts an example of the amount of network traffic that is captured and utilized in techniques described herein. In other words, diagram 650 illustrates how the techniques presented herein may be used to observe and utilize network activity to determine network traffic caused by a given executable when used in a stand-alone capacity (e.g., without consideration for data or information gathered or learned in sandboxing techniques). Similar to diagram 600, the network traffic capture data is sorted by executables at column 652 and the length of a network traffic capture is illustrated in column 654. However, the actual data included in diagram 650 has a number of significant differences from the data included in diagram 600. Most notably, when network traffic is evaluated using the techniques presented herein, multiple cases may be run for a single executable and the length of captured network traffic may be significantly longer and more varied. In fact, as discussed above, when proxy logs are retrieved according to the techniques presented herein, the proxy logs may cover any arbitrary span of time, perhaps varying from five minutes of activity (as shown at 656) to three days of activity (as shown at 658). Moreover, if desirable, multiple cases can be run for a single executable. For example, a first case 660 (exe6) and a second case 662 (exe6b) are run for the same executable (exe6), a first case 670 (exe14) and a second case 672 (exe14b) are run for the same executable (exe11), and a first case 680 (exe11) and a second case 682 (exe11b) are run for the same executable (exe11).

Finally, FIG. 6C illustrates how the techniques described herein may be used together with sandboxing techniques to provide more detailed information that may be used for more detailed analysis of selected executables, such as potentially malicious executables. In FIG. 6C, the network traffic capture data is again sorted by executables at column 702 and the length of a network traffic capture is illustrated in column 704. As can be seen, when the techniques described herein are used in concert with existing sandbox techniques, the techniques described herein may provide a more comprehensive capture of network traffic. Most notably, when combined, techniques presented herein may capture at least some network traffic for a large number of executables that could be covered with traditional sandboxing techniques while also capturing extensive network traffic for a select number of executables, including network traffic from multiple cases run for a specific executable. As an example, in diagram 700, the network traffic captured using conventional sandboxing techniques for executables 6, 11, and 14 (illustrated at 612, 614, and 616) can be combined with the network traffic captured for executables 6, 11, and 14 captured using techniques described herein (illustrated at 660, 662, 680, 682, 670, and 672). In other words, short captures of network traffic can be combined with longer captures of network traffic in order to form a more complete view of the network traffic. This combination may be especially valuable when polymorphic executables are being analyzed, as it may allow slight variations in these polymorphic executables to be detected over time.

The techniques provided herein provide a number of advantages. For example, techniques presented herein provide an analysis tools that provide similar information to sandboxing techniques without being detectable by malware. Since malware cannot evade the techniques presented herein, anti-evasion methods need not be developed, updated, or maintained, thereby drastically lowering the costs associated with installing and maintaining the techniques presented herein, as compared to conventional sandboxing techniques. Moreover, on a larger scale, techniques presented herein are significantly less costly than conventional sandboxing techniques because a controlled environment does need to be maintained. In fact, in some embodiments, techniques presented herein may be implemented strictly as software and utilize existing technology to collect proxy logs. Moreover, techniques presented herein may be able to analyze larger captures of network traffic for more cases per executable as compared to conventional sandboxing techniques. In fact, the only factor limiting the length of network traffic analyzed by techniques presented herein may be the length of proxy logs.

As still further examples of an advantage provided by techniques presented herein, the techniques herein can complement conventional sandboxing techniques, leading to more complete captures of malicious traffic and consequently to significantly more accurate remedies. For example, these techniques may provide a more accurate view of an executable's variable behavior over time, which may be used to supplement behavioral information discovered with conventional sandboxing techniques. Similarly, techniques presented herein can be used to identify commonalities between different executables (hashes), effectively enabling identifications of variations of the same malware (e.g., various executable files generated with the same exploit kit). In some instances these commonalities may be more precise than commonalities identified during relatively short identifications made with conventional sandboxing techniques.

To summarize, in one form, a method is provided comprising: at a server having connectivity to the Internet, retrieving sets of proxy logs from a plurality of proxy servers, wherein each proxy server of the plurality of proxy servers is associated with a network and generates network traffic logs for one or more nodes included in the network; determining a set of executables hosted by each of the one or more nodes associated with each of the plurality of proxy servers; analyzing each set of executables to detect a specific executable; identifying portions of each of the network traffic logs that are associated with the specific executable; and generating an alert indicating the portions of each of the network traffic logs as likely to be malicious.

In another form, a system is provided comprising: a plurality of proxy servers, each proxy server having connectivity to the Internet, wherein each proxy server of the plurality of proxy servers is associated with a network and generates network traffic logs for one or more nodes included in the network; and a server having connectivity to each of the proxy servers via the Internet and including a processor configured to: retrieve sets of proxy logs from the plurality of proxy servers; determine a set of executables hosted by each of the one or more nodes associated with each of the plurality of proxy servers; analyze each set of executables to detect a specific executable; identify portions of each of the network traffic logs that are associated with the specific executable; and generate an alert indicating the portions of each of the network traffic logs as likely to be malicious.

In yet another form, a non-transitory computer-readable storage media is provided that is encoded with software comprising computer executable instructions and when the software is executed operable to: retrieve sets of proxy logs from a plurality of proxy servers, wherein each proxy server of the plurality of proxy servers is associated with a network and generates network traffic logs for one or more nodes included in the network; determine a set of executables hosted by each of the one or more nodes associated with each of the plurality of proxy servers; analyze each set of executables to detect a specific executable; identify portions of each of the network traffic logs that are associated with the specific executable; and generate an alert indicating the portions of each of the network traffic logs as likely to be malicious.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a server having connectivity to the Internet, retrieving sets of proxy logs from a plurality of proxy servers, wherein each proxy server of the plurality of proxy servers is associated with a network and generates network traffic logs for one or more nodes included in the network;
   determining a set of executables, including malicious and non-malicious executables, hosted by each of the one or more nodes associated with each proxy server of the plurality of proxy servers;
   selecting a specific executable from the set of executables for analysis;
   analyzing the set of executables hosted by each of the one or more nodes associated with each proxy server of the plurality of proxy servers to detect the specific executable;
   determining a group of nodes that each host the specific executable;
   identifying similar portions of network traffic logs of the nodes in the group;
   identifying portions of each of the network traffic logs that are associated with the specific executable by comparing the similar portions of the network traffic logs of the nodes in the group to the network traffic logs of the nodes not in the group, wherein the similar portions of the network traffic logs that are dissimilar from the network traffic logs of the nodes not in the group comprise the portions of the network traffic logs that are associated with the specific executable;

determining that the specific executable is malicious when the identified portions of each of the network traffic logs include indicators of compromise indicative of maliciousness; and generating an alert indicating that the portions of each of the network traffic logs associated with the specific executable are malicious.

2. The method of claim 1, wherein portions of the network traffic logs are identified as similar based on at least one of: fingerprints of network traffic; query structure of network traffic; domain path structure of network traffic; quantity of network traffic; and frequency of network traffic.

3. The method of claim 1, wherein determining a set of executables hosted by each of the one or more nodes in the network associated with a corresponding one of the plurality of proxy servers further comprises:
   extracting the set of executables from the proxy logs by at least one of:
      identifying references to the set of executables in network traffic included in the proxy logs; and
      identifying network traffic included in the proxy logs that is known to originate from an executable.

4. The method of claim 1, wherein the specific executable is identified as malicious based further on sandboxing techniques.

5. The method of claim 1, further comprising:
   automatically performing one or more of the following actions:
      denying of inbound and outbound traffic from domains included in the portions of each of the network traffic logs; and
      preventing installation of an application update.

6. A system comprising:
   a plurality of proxy servers, each proxy server having connectivity to the Internet, wherein each proxy server of the plurality of proxy servers is associated with a network and generates network traffic logs for one or more nodes included in its associated network; and
   a server having connectivity to each of the proxy servers via the Internet, and including a processor configured to:
      retrieve sets of proxy logs from the plurality of proxy servers;
      determine a set of executables, including malicious and non-malicious executables, hosted by each of the one or more nodes associated with each proxy server of the plurality of proxy servers;
      select a specific executable from the set of executables for analysis;
      analyze the set of executables hosted by each of the one or more nodes associated with each proxy server of the plurality of proxy servers to detect the specific executable;
      determine a group of nodes that each host the specific executable;
      identify similar portions of network traffic logs of the nodes in the group;
      identify portions of each of the network traffic logs that are associated with the specific executable by comparing the similar portions of the network traffic logs of the nodes in the group to the network traffic logs of the nodes not in the group, wherein the similar portions of the network traffic logs that are dissimilar from the network traffic logs of the nodes not in the group comprise the portions of the network traffic logs that are associated with the specific executable;
      determine that the specific executable is malicious when the identified portions of each of the network traffic logs include indicators of compromise indicative of maliciousness; and
      generate an alert indicating that the portions of each of the network traffic logs associated with the specific executable are malicious.

7. The system of claim 6, wherein portions of the network traffic logs are identified as similar based on at least one of: fingerprints of network traffic; query structure of network traffic; domain path structure of network traffic; quantity of network traffic; and frequency of network traffic.

8. The system of claim 6, wherein, in determining a set of executables hosted by each of the one or more nodes in the network associated with a corresponding one of the plurality of proxy servers, the processor is further configured to:
   extract the set of executables from the proxy logs by at least one of:
      identifying references to the set of executables in network traffic included in the proxy logs; and
      identifying network traffic included in the proxy logs that is known to originate from an executable.

9. The system of claim 6, wherein the specific executable is identified as malicious based further on sandboxing techniques.

10. The system of claim 6, wherein the processor is further configured to:
    automatically perform one or more of the following actions:
       denying inbound and outbound traffic from domains included in the portions of each of the network traffic logs; and
       preventing installation of an application update.

11. A non-transitory computer-readable storage media encoded with software comprising computer executable instructions and when the software is executed operable to:
    retrieve sets of proxy logs from a plurality of proxy servers, wherein each proxy server of the plurality of proxy servers is associated with a network and generates network traffic logs for one or more nodes included in the network;
    determine a set of executables, including malicious and non-malicious executables, hosted by each of the one or more nodes associated with each proxy server of the plurality of proxy servers;
    select a specific executable from the set of executables for analysis;
    analyze the set of executables hosted by each of the one or more nodes associated with each proxy server of the plurality of proxy servers to detect the specific executable;
    determine a group of nodes that each host the specific executable;
    identify similar portions of network traffic logs of the nodes in the group;
    identify portions of each of the network traffic logs that are associated with the specific executable by comparing the similar portions of the network traffic logs of the nodes in the group to the network traffic logs of the nodes not in the group, wherein the similar portions of the network traffic logs that are dissimilar from the network traffic logs of the nodes not in the group comprise the portions of the network traffic logs that are associated with the specific executable;

determine that the specific executable is malicious when the identified portions of each of the network traffic logs include indicators of compromise indicative of maliciousness; and generate an alert indicating that the portions of each of the network traffic logs associated with the specific executable are malicious.

12. The non-transitory computer-readable storage media of claim 11, wherein the instructions operable to determine a set of executables hosted by each of the one or more nodes in the network associated with a corresponding one of the plurality of proxy servers, are further operable to:

extract the set of executables from the proxy logs by at least one of:

identifying references to the set of executables in network traffic included in the proxy logs; and identifying network traffic included in the proxy logs that is known to originate from an executable.

13. The non-transitory computer-readable storage media of claim 11, wherein the specific executable is identified as malicious based further on sandboxing techniques.

14. The non-transitory computer-readable storage media of claim 11, wherein the wherein the instructions are further operable to:

automatically perform one or more of the following actions:

denying inbound and outbound traffic from domains included in the portions of each of the network traffic logs; and preventing installation of an application update.

15. The non-transitory computer-readable storage media of claim 11, wherein portions of the network traffic logs are identified as similar based on at least one of: fingerprints of network traffic; query structure of network traffic; domain path structure of network traffic; quantity of network traffic; and frequency of network traffic.

* * * * *